United States Patent
Wu

(10) Patent No.: US 10,320,641 B2
(45) Date of Patent: Jun. 11, 2019

(54) SWITCH DEVICE FOR SUBSTATION AND ERROR WARNING METHOD THEREOF

(71) Applicant: MOXA INC., New Taipei (TW)

(72) Inventor: Hsi-Chin Wu, New Taipei (TW)

(73) Assignee: MOXA INC., New Taipei (TW)

( * ) Notice: Subject to any disclaimer, the term of this patent is extended or adjusted under 35 U.S.C. 154(b) by 0 days.

(21) Appl. No.: 15/725,268

(22) Filed: Oct. 4, 2017

(65) Prior Publication Data

US 2019/0104043 A1  Apr. 4, 2019

(51) Int. Cl.
*H04L 12/26* (2006.01)

(52) U.S. Cl.
CPC .......... *H04L 43/0823* (2013.01); *H04L 43/06* (2013.01)

(58) Field of Classification Search
CPC ..... H04L 43/0823; H04L 43/06; H02H 7/261; H02H 7/262
See application file for complete search history.

(56) References Cited

U.S. PATENT DOCUMENTS

| 2012/0265360 A1* | 10/2012 | Smit | H02H 7/262 |
| | | | 700/293 |
| 2014/0159740 A1* | 6/2014 | Schuster | H02H 7/261 |
| | | | 324/522 |
| 2014/0293494 A1* | 10/2014 | Allen | H02H 7/20 |
| | | | 361/93.1 |
| 2017/0307676 A1* | 10/2017 | Gaouda | G01R 31/086 |
| 2018/0109114 A1* | 4/2018 | Yang | H04L 67/12 |

* cited by examiner

*Primary Examiner* — Min Jung

(74) *Attorney, Agent, or Firm* — Chih Feng Yeh; Huntington IP Consulting Co., Ltd.

(57) ABSTRACT

The present disclosure illustrates a switch device for substation and an error warning method thereof. The switch device accesses and copies a generic object oriented substation event (GOOSE) packet, and when the copied GOOSE packet is determined to trigger an abnormal condition event, the switch device generates and transmits an abnormal condition event confirmation request to an upstream switch device. A warning message is issued when a ready response cannot be received by the switch device from the upstream switch device. Therefore, the technical effect of quickly and accurately finding the switch device triggering the abnormal condition event first to facilitate repair may be achieved.

10 Claims, 5 Drawing Sheets

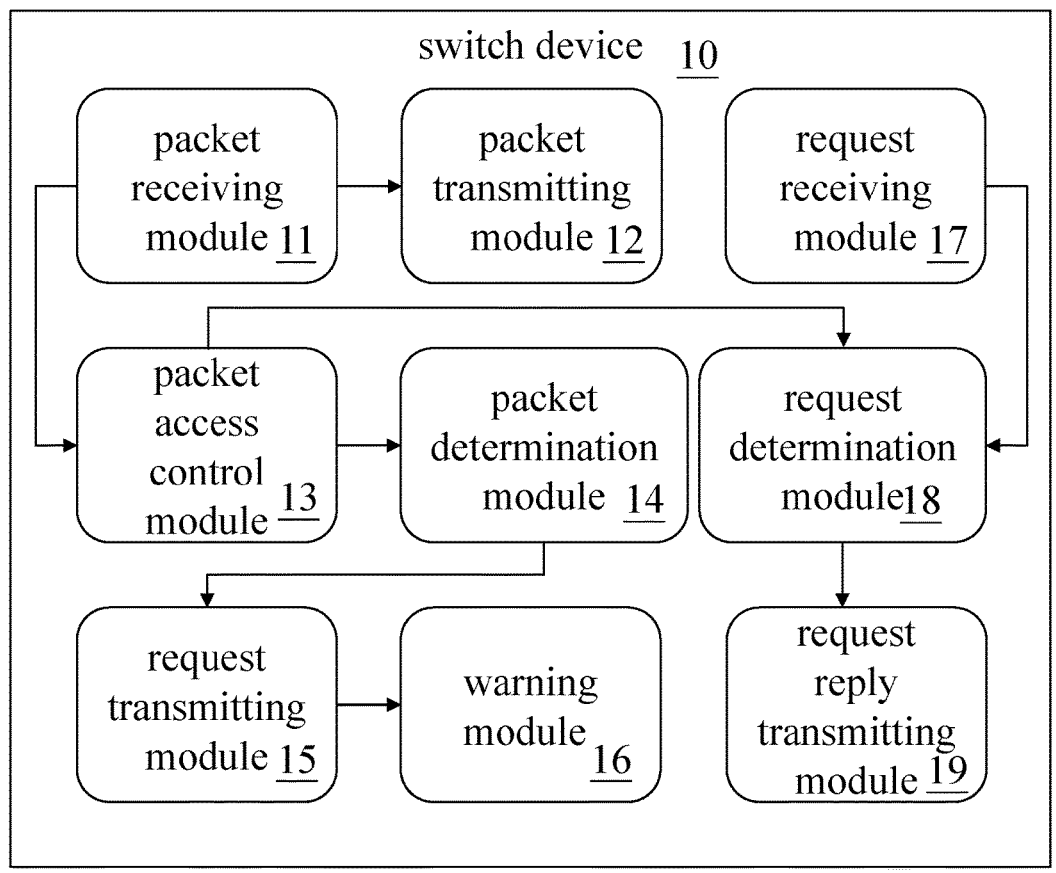
【FIG. 1】

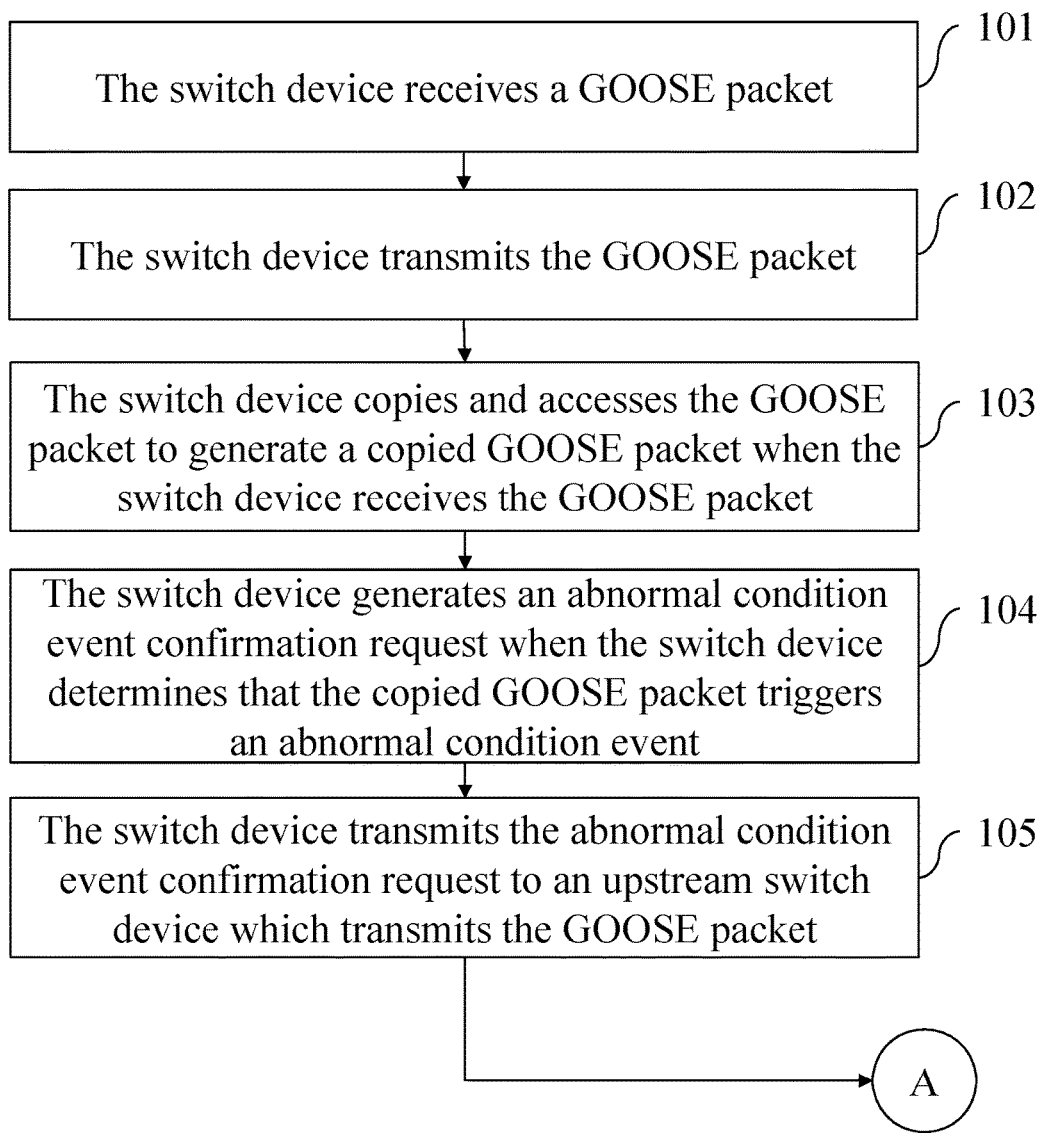
[FIG. 2A]

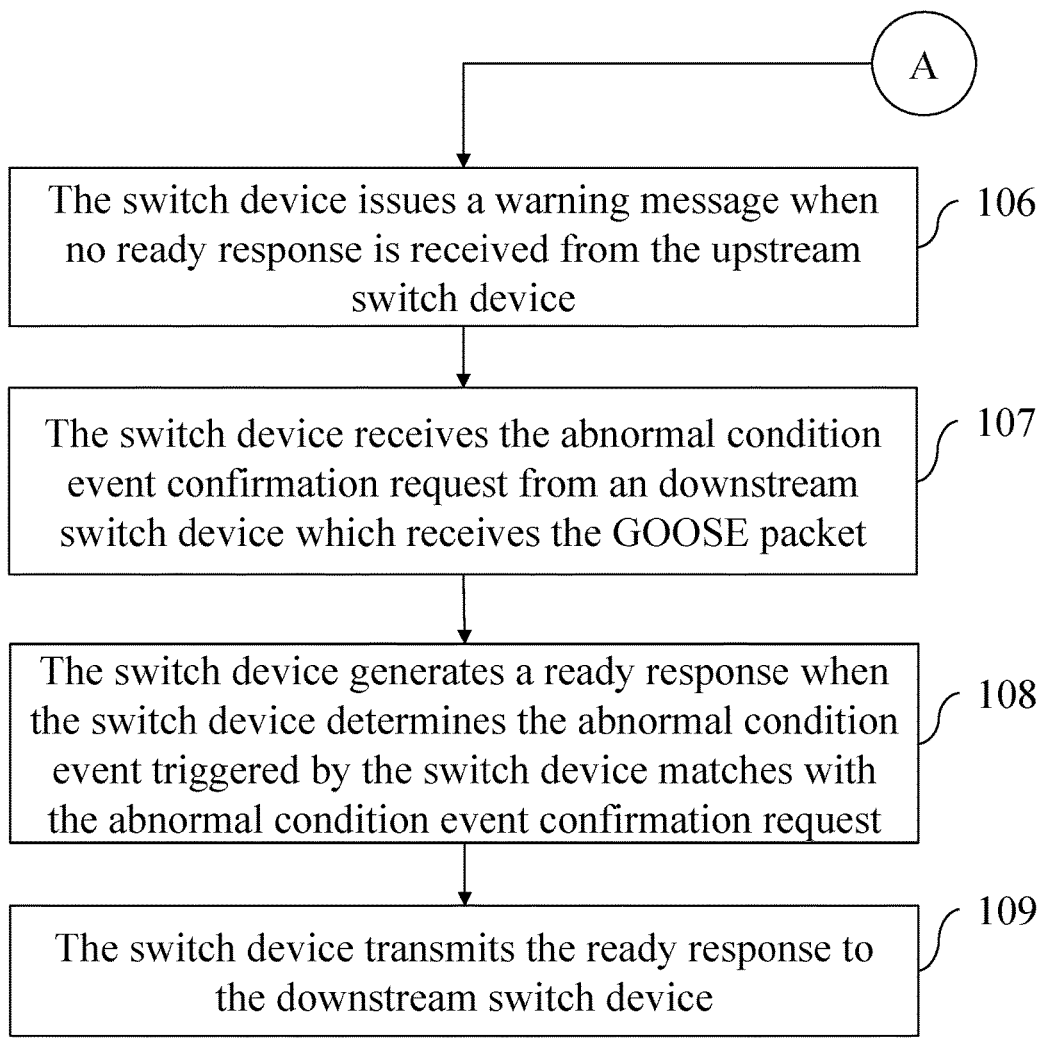
[FIG. 2B]

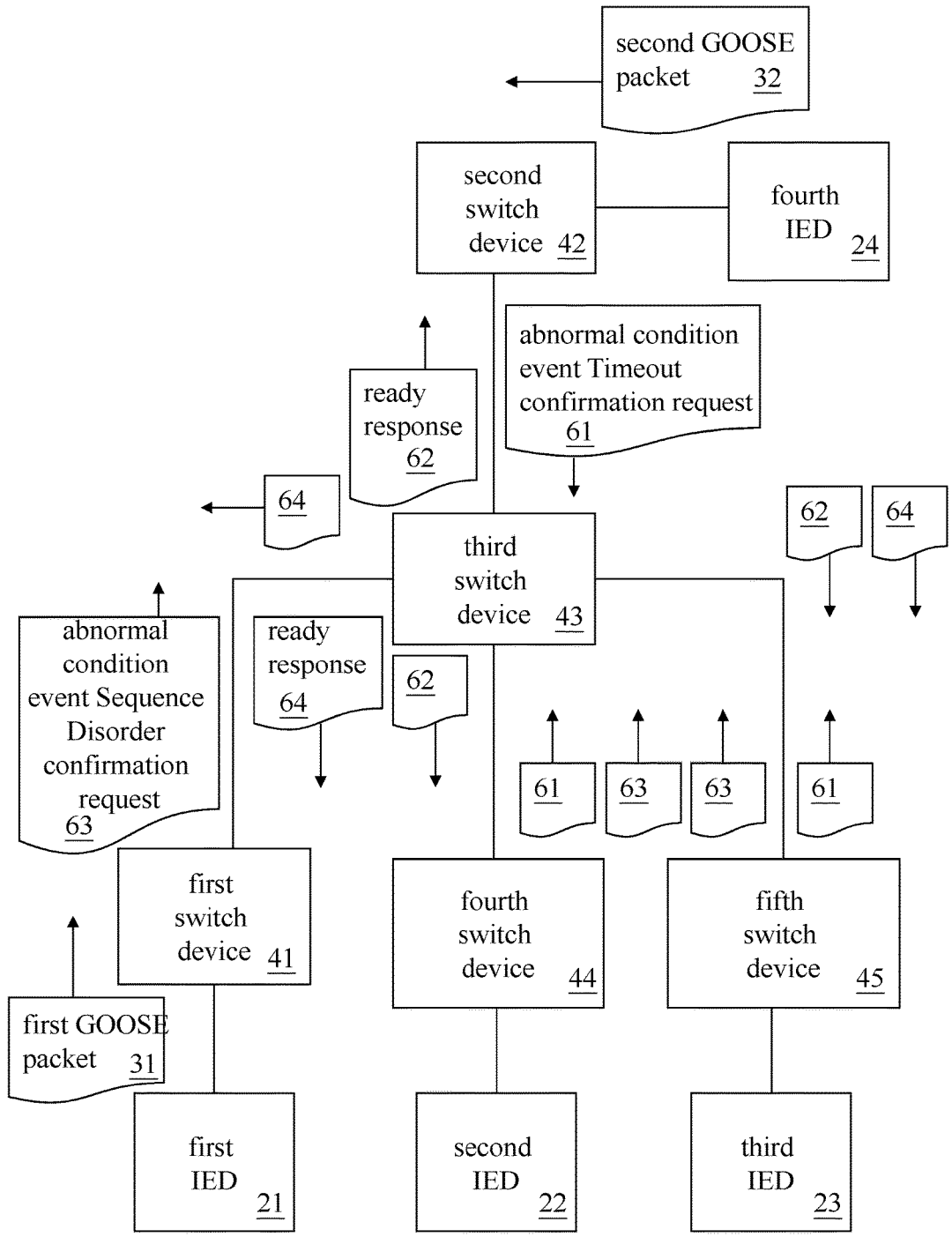
【FIG. 3】

| Port | Packet |
|---|---|
| second input port | first GOOSE packet |
| first input port | second GOOSE packet |

(A)

| Port | Packet |
|---|---|
| first input port | first GOOSE packet |
| second input port | second GOOSE packet |

(B)

| Port | Packet |
|---|---|
| first input port | first GOOSE packet |
| second input port | second GOOSE packet |

(C)

| Port | Packet |
|---|---|
| first input port | first GOOSE packet |
| first input port | second GOOSE packet |

(D)

| Port | Packet |
|---|---|
| first input port | first GOOSE packet |
| first input port | second GOOSE packet |

SWITCH DEVICE FOR SUBSTATION AND ERROR WARNING METHOD THEREOF

BACKGROUND

1. Technical Field

The present disclosure relates to a switch device and an error warning method, more particularly to a switch device for substation and an error warning method thereof.

2. Description of Related Arts

The Generic Object Oriented Substation Event (abbreviated as GOOSE) protocol is the most important communication protocol defined in IEC 61850 standard for substation. The GOOSE protocol defines controlling commands used between intelligent electronic devices (abbreviated as IED) disposed in the substation.

When an abnormal event occurs in system of the substation, power lines distributed in the area, where the abnormal event occurs, are isolated to stop supplying power, thereby protecting other areas to supply power normally. As a result, when the GOOSE packet can respond correctly and immediately, the areas affected by the abnormal event can be reduced and the loss in money and operation of the substation can be lowered.

In a conventional system, when the intelligent electronic device does not normally receive the GOOSE packet transmitted from other intelligent electronic device, maintenance staff must check communication statuses of all switch devices between the intelligent electronic device and other intelligent electronic devices one by one, in order to find the cause of failure. However, the network structure of the substation is very complicated, so the efficiency in troubleshoot may be poor, it results in longer recovery time and more loss for power supply system.

Therefore, what is need is to develop a switch device to solve the conventional technology problem of poor efficiency in detecting failure of the switch device for the substation.

SUMMARY

In order to solve the conventional technology problem of poor efficiency in detecting failure of the switch device for the substation, the present disclosure is to provide a switch device for a substation and an error warning method thereof.

According to an embodiment, the present disclosure provides a switch device for a substation. The switch device includes a packet receiving module, a packet transmitting module, a packet access control module, a packet determination module, a request transmitting module, a warning module, a request receiving module, a request determination module, and a request reply transmitting module.

The packet receiving module is configured to receive a generic object oriented substation event (GOOSE) packet. The packet transmitting module is configured to transmit the GOOSE packet. The packet access control module is configured to access and copy the GOOSE packet when the packet receiving module receives the GOOSE packet, to generate a copied GOOSE packet. The packet determination module is configured to generate an abnormal condition event confirmation request when the packet determination module determines that the copied GOOSE packet triggers an abnormal condition event. The request transmitting module is configured to transmit the abnormal condition event confirmation request to an upstream switch device which transmits the GOOSE packet. The warning module is configured to issue a warning message when no ready response is received from the upstream switch device. The request receiving module is configured to receive the abnormal condition event confirmation request from a downstream switch device which receives the GOOSE packet.

The request determination module is configured to generate a ready response when the request determination module determines that the abnormal condition event triggered by the switch device matches with the abnormal condition event confirmation request. The request reply transmitting module is configured to transmit the ready response to the downstream switch device.

According to an embodiment, the present disclosure provides an error warning method for a switch device for a substation, and the error warning method includes following steps: receiving, by the switch device, an generic object oriented substation event (GOOSE) packet; next, transmitting, by the switch device, the GOOSE packet; copying and accessing the GOOSE packet to generate a copied GOOSE packet when the switch device receives the GOOSE packet; next, generating an abnormal condition event confirmation request when the switch device determines that the copied GOOSE packet triggers an abnormal condition event; transmitting, by the switch device, the abnormal condition event confirmation request to an upstream switch device which transmits the GOOSE packet; next, issuing a warning message when no ready response is received from the upstream switch device; receiving, by the switch device, the abnormal condition event confirmation request from an downstream switch device which receives the GOOSE packet; generating a ready response when the switch device determines the abnormal condition event triggered by the switch device matches with the abnormal condition event confirmation request; and transmitting, by the switch device, the ready response to the downstream switch device.

According to above content, the difference between the present disclosure and the conventional technology is that the switch device of the present disclosure can copy and access the GOOSE packet, and when the switch device determines that the copied GOOSE packet triggers the abnormal condition event, the switch device generates and transmits the abnormal condition event confirmation request to the corresponding upstream switch device, and the switch device then issues the warning message if the switch device does not receive the ready response from the upstream switch device.

By using above-mentioned technical means, the technical effect of quickly and accurately finding the switch device, which triggers the abnormal condition event first, to facilitate repair can be achieved.

BRIEF DESCRIPTION OF THE DRAWINGS

The structure, operating principle and effects of the present disclosure will be described in detail by way of various embodiments which are illustrated in the accompanying drawings.

FIG. 1 is a block diagram of a switch device for a substation, in accordance with the present disclosure.

FIGS. 2A and 2B are flowcharts showing the steps in an operation of an error warning method for the switch device of the present disclosure.

FIG. 3 is a schematic view of architecture of the switch devices warning an error, in accordance with the present disclosure.

FIG. 4 is a schematic view showing packet port mapping tables established by the switch devices for the substation, during operation of the error warning method of the present disclosure.

DETAILED DESCRIPTION

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

Please refer to FIG. 1, which is a block diagram of the switch device for the substation, in accordance with the present disclosure.

The technology of the present disclosure is particularly applied to the substation. Intelligent electronic devices (IEDs) disposed in the substation can transmit generic object oriented substation event (GOOSE) packets to other IEDs through the switch devices of the present disclosure. According to disposal of the switch devices of the present disclosure, the switch device triggering an abnormal condition event first can be quickly and accurately obtained, thereby facilitating maintenance staff to repair the switch device or the interconnection between the switch devices.

The switch device 10 of the present disclosure includes a packet receiving module 11, a packet transmitting module 12, a packet access control module 13, a packet determination module 14, a request transmitting module 15, a warning module 16, a request receiving module 17, a request determination module 18, and a request reply transmitting module 19.

The switch device 10 can be interconnected with the IED or other switch device 10, so that the IED can transmit the GOOSE packet to other IED through the switch device 10. The packet receiving module 11 of the switch device 10 can receive the GOOSE packet from the IED or an upstream switch device. It should be noted that the other switch device transmitting the GOOSE packet to the packet receiving module 11 of the switch device 10 is regarded as the upstream switch device, in order to distinguish the switch device 10 from the other switch device.

When the packet receiving module 11 of the switch device 10 receives the GOOSE packet, the packet access control module 13 of the switch device 10 can access the GOOSE packet by using packet access control function of an Ethernet switch chip to generate a copied GOOSE packet for further packet determination process.

The switch device 10 also establishes a packet port mapping table which records the corresponding relationships between the copied GOOSE packets and input ports. For example, when a first input port of the switch device 10 receives the first GOOSE packet and generates a first copied GOOSE packet, the switch device 10 establishes the corresponding relationship between the first copied GOOSE packet and the first input port and stores the corresponding relationship in the packet port mapping table. However, this example is merely for exemplary illustration and the application field of the present disclosure is not limited thereto.

The packet transmitting module 12 of the switch device 10 can transmit the GOOSE packet to the IED or a downstream switch device. In order to distinguish the switch device 10 from other switch device, the switch device receiving the GOOSE packet from the switch device 10 is regarded as the downstream switch device. Through the packet receiving module 11 and the packet transmitting module 12 of the switch device 10, the IED can transmit the GOOSE packet to other IED After the packet access control module 13 of the switch device 10 accesses the copied GOOSE packet, the packet determination module 14 of the switch device 10 checks contents of a TATL field, a sqNum field, an APP ID field and a goCBRef field of the copied GOOSE packet, to determine whether the copied GOOSE packet triggers an abnormal condition event Timeout, an abnormal condition event Tampered, or an abnormal condition event Sequence Disorder.

Particularly, the packet determination module 14 of the switch device 10 can determine whether the copied GOOSE packet triggers the abnormal condition event Timeout according to a value stored in the TATL field of the copied GOOSE packet; the packet determination module 14 of the switch device 10 can determine whether the copied GOOSE packet triggers the abnormal condition event Sequence Disorder according to a value stored in the sqNum field of the copied GOOSE packet; the packet determination module 14 of the switch device 10 can determine whether the copied GOOSE packet triggers the abnormal condition event Tampered according to contents stored in the APP ID field and the goCBRef field of the copied GOOSE packet. These examples are merely for exemplary illustration, and the application field of the present disclosure is not limited thereto.

When the packet determination module 14 of the switch device 10 determines that the copied GOOSE packet triggers the abnormal condition event, the packet determination module 14 generates an abnormal condition event confirmation request corresponding to the abnormal condition event triggered by the copied GOOSE packet, and the request transmitting module 15 of the switch device 10 transmits the abnormal condition event confirmation request to a corresponding upstream switch device, according to the packet port mapping table established by the switch device 10.

Particularly, after the packet determination module 14 of the switch device 10 determines that the copied GOOSE packet triggers the abnormal condition event Timeout, the packet determination module 14 generates an abnormal condition event Timeout confirmation request corresponding to the abnormal condition event Timeout, and the request transmitting module 15 of the switch device 10 transmits the abnormal condition event Timeout confirmation request to a corresponding upstream switch device. However, this example is merely for exemplary illustration, and the application field of the present disclosure is not limited thereto.

If the switch device 10 does not receive a ready response from the corresponding upstream switch device in a predetermined time interval, the warning module 16 of the switch device 10 can generate and issue a warning message according to the abnormal condition event and the packet port mapping table, and the warning message indicates that the switch device 10 is the switch device triggering the abnormal condition event first. If the switch device 10 receives the ready response from the corresponding to upstream switch device in the predetermined time interval, it indicates that the switch device 10 and the upstream switch device both trigger the same abnormal condition event, and in this case, the warning module 16 of the switch device 10 does not generate and issue the warning message according to the abnormal condition event and the packet port mapping table, because the switch device 10 is not the switch device triggering the abnormal condition event first.

Particularly, when the copied GOOSE packet triggers the abnormal condition event Timeout and the corresponding relationship between the first copied GOOSE packet and the first input port is established, the warning message generated by the warning module 16 of the switch device 10 indicates that the first GOOSE packet received from the first input port triggers the abnormal condition event Timeout. However, this example is merely for exemplary illustration, and the application field of the present disclosure is not limited thereto.

The request receiving module 17 of the switch device 10 is configured to receive an abnormal condition event confirmation request from the corresponding downstream switch device which receives the GOOSE packet, and the request determination module 18 of the switch device 10 determines whether the abnormal condition event triggered by the switch device 10 matches with the abnormal condition event confirmation request, and when the request determination module 18 of the switch device 10 determines that the abnormal condition event triggered by itself matches with the abnormal condition event confirmation request, the request determination module 18 generates the ready response, and the request reply transmitting module 19 of the switch device 10 transmits the ready response, which is generated by the request determination module 18 of the switch device 10, to the corresponding downstream switch device. When the request determination module 18 of the switch device 10 determines that the switch device 10 does not trigger the abnormal condition event matching with the abnormal condition event confirmation request, the request determination module 18 does not generate the ready response and the request reply transmitting module 19 of the switch device 10 does not transmit any ready response to the corresponding downstream switch device.

The following describes an embodiment to illustrate operation of embodiment of the device and method of the present disclosure. Please refer to FIGS. 2A, 2B, 3 and 4. FIGS. 2A and 2B are flowcharts showing the steps in an operation of the error warning method for switch device of the present disclosure. FIG. 3 is a schematic view of architecture of switch devices warning error, in accordance with the present disclosure. FIG. 4 is a schematic view showing packet port mapping tables established by the switch devices for the substation, during operation of the error warning method of the present disclosure.

In a step 101, a first intelligent electronic device 21 transmits a first GOOSE packet 31 to a third intelligent electronic device 23, and a first switch device 41, a second switch device 42, a third switch device 43, a fourth switch device 44 and a fifth switch device 45 respectively receive the first GOOSE packet 31 and the second GOOSE packet 32. In a step 102, the first switch device 41, the second switch device 42, the third switch device 43, the fourth switch device 44 and the fifth switch device 45 respectively transmit the first GOOSE packet 31 and the second GOOSE packet 32. In a step 103, the first switch device 41, the second switch device 42, the third switch device 43, the fourth switch device 44 and the fifth switch device 45 respectively copy the first GOOSE packet 31 and the second GOOSE packet 32 for sequential access and determination.

When a fourth intelligent electronic device 24 transmits the second GOOSE packet 32 to a second intelligent electronic device 22, the first switch device 41 establishes a first packet port mapping table 51, as shown in the part (A) of FIG. 4; and the second switch device 42 establishes a second packet port mapping table 52, as shown in the part (B) of FIG. 4; and the third switch device 43 establishes a third packet port mapping table 53, as shown in the part (C) of FIG. 4; and the fourth switch device 44 establishes a fourth packet port mapping table 54, as shown in the part (D) of FIG. 4; and the fifth switch device 45 establishes a fifth packet port mapping table 55, as shown in the part (E) of FIG. 4.

In a step 104, when the second switch device 42, the third switch device 43, the fourth switch device 44 and the fifth switch device 45 respectively determine that the copied first GOOSE packet triggers an abnormal condition event Timeout, the second switch device 42, the third switch device 43, the fourth switch device 44 and the fifth switch device 45 respectively generate an abnormal condition event Timeout confirmation request 61 according to the abnormal condition event Timeout.

In steps 105 and 107, according to the second packet port mapping table 52, the second switch device 42 can transmit the abnormal condition event Timeout confirmation request 61 to the third switch device 43, and according to the fourth packet port mapping table 54, the fourth switch device 44 can transmit the abnormal condition event Timeout confirmation request 61 to the third switch device 43, and according to the fifth packet port mapping table 55, the fifth switch device 45 can transmit the abnormal condition event Timeout confirmation request 61 to the third switch device 43.

In a step 108, the third switch device 43, the second switch device 42, the fourth switch device 44 and the fifth switch device 45 all transmit the abnormal condition event Timeout confirmation request 61, so the third switch device 43 generates a ready response 62 when the third switch device 43 receives the abnormal condition event Timeout confirmation request 61 from the second switch device 42, the fourth switch device 44 and the fifth switch device 45 respectively, and in a step 109, the third switch device 43 transmits the ready response 62 to the second switch device 42, the fourth switch device 44 and the fifth switch device 45, respectively.

The second switch device 42, the fourth switch device 44 and the fifth switch device 45 can receive the ready response 62 from the third switch device 43 within the predetermined time interval, so the second switch device 42 does not generate and issue the warning message according to the abnormal condition event Timeout and the second packet port mapping table 52, and the fourth switch device 44 does not generate and issue the warning message according to the abnormal condition event Timeout and the fourth packet port mapping table 54, and the fifth switch device 45 does not generate and issue the warning message according to the abnormal condition event Timeout and the fifth packet port mapping table 55.

In the step 105 and 107, the third switch device 43 can transmit the abnormal condition event Timeout confirmation request 61 to the first switch device 41 according to the third packet port mapping table 53. However, the first switch device 41 does not trigger the abnormal condition event Timeout, so, in a step 106, the first switch device 41 does not generate the ready response when the first switch device 41 receives the abnormal condition event Timeout confirmation request 61 from the third switch device 43; in other words, the third switch device 43 does not receive the ready response from the first switch device 41 in the predetermined time interval, so the third switch device 43 generates and issues the warning message according to the abnormal condition event Timeout and the third packet port mapping table 53, and the warning message indicates that the first GOOSE packet received from the first input port triggers the abnormal condition event Timeout. As a result, the maintenance staff can repair the first switch device 41, the third switch device 43 or the interconnection between the first switch device 41 and the third switch device 43.

In a step 104, the first switch device 41, the third switch device 43, the fourth switch device 44 and the fifth switch device 45 respectively determine that the copied second GOOSE packet triggers an abnormal condition event Sequence Disorder, and the first switch device 41, the third switch device 43, the fourth switch device 44 and the fifth switch device 45 respectively generate an abnormal condition event Sequence Disorder confirmation request 63 according to the abnormal condition event Sequence Disorder.

In the step 105 and 107, according to the first packet port mapping table 51, the first switch device 41 transmits the abnormal condition event Sequence Disorder confirmation request 63 to the third switch device 43; according to the fourth packet port mapping table 54, the fourth switch device 44 transmits the abnormal condition event Sequence Disorder confirmation request 63 to the third switch device 43; and according to the fifth packet port mapping table 55, the fifth switch device 45 transmits the abnormal condition event Sequence Disorder confirmation request 63 to the third switch device 43.

In a step 108, the third switch device 43, the first switch device 41, the fourth switch device 44 and the fifth switch device 45 all trigger the abnormal condition event Sequence Disorder confirmation request 63, so the third switch device 43 generates the ready response 64 when the third switch device 43 receives the abnormal condition event Sequence Disorder confirmation request 63 from the first switch device 41, the fourth switch device 44 and the fifth switch device 45. In a step 109, the third switch device 43 transmits the ready response 64 to the first switch device 41, the fourth switch device 44 and the fifth switch device 45, respectively.

The first switch device 41, the fourth switch device 44 and the fifth switch device 45 receives the ready response 64 from the third switch device 43 within the predetermined time interval, so the first switch device 41 does not generate and issue the warning message according to the abnormal condition event Sequence Disorder and the first packet port mapping table, and the fourth switch device 44 does not generate and issue the warning message according to the abnormal condition event Sequence Disorder and the fourth packet port mapping table 54, and the fifth switch device 45 does not generate and issue the warning message according to the abnormal condition event Sequence Disorder and the fifth packet port mapping table 55.

In the steps 105 and 107, according to the third packet port mapping table 53, the third switch device 43 can transmit the abnormal condition event Sequence Disorder confirmation request 63 to the second switch device 42; however, the second switch device 42 does not trigger the abnormal condition event Sequence Disorder, so the second switch device 42 does not generate the ready response when the second switch device 42 receives the abnormal condition event Sequence Disorder confirmation request 63 from the third switch device 43. As a result, in the step 106, the third switch device 43 does not receive the ready response from the second switch device 42 within the predetermined time interval, so the third switch device 43 can generate and issue the warning message according to the abnormal condition event Sequence Disorder and the third packet port mapping table 53. The warning message indicates that the second GOOSE packet received from the second input port triggers the abnormal condition event Sequence Disorder. According to the warning message, the maintenance staff can repair the second switch device 42, the switch device switch device 43, or the interconnection between the second switch device 42 and the third switch device 43.

To summarize, the difference between the present disclosure and the conventional technology is that the switch device of the present disclosure can copy and access the GOOSE packet, and when the switch device determines that the copied GOOSE packet triggers the abnormal condition event, the switch device generates and transmits the abnormal condition event confirmation request to the corresponding upstream switch device, and the switch device then issues the warning message if the switch device does not receive the ready response from the upstream switch device.

By using above-mentioned technical means, the conventional technology problem of poor efficiency of detecting the error of switch device applied in the substation can be solved, and the maintenance staff can quickly and accurately obtain the switch device triggering the abnormal condition event first, so as to improve repair efficiency.

The present disclosure disclosed herein has been described by means of specific embodiments. However, numerous modifications, variations and enhancements can be made thereto by those skilled in the art without departing from the spirit and scope of the invention set forth in the claims.

What is claimed is:
1. A switch device for a substation, comprising:
   a packet receiving module configured to receive a generic object oriented substation event (GOOSE) packet;
   a packet transmitting module configured to transmit the GOOSE packet;
   a packet access control module configured to access and copy the GOOSE packet, when the packet receiving module receives the GOOSE packet, to generate a copied GOOSE packet;
   a packet determination module configured to generate an abnormal condition event confirmation request when the packet determination module determines that the copied GOOSE packet triggers an abnormal condition event;
   a request transmitting module configured to transmit the abnormal condition event confirmation request to an upstream switch device which transmits the GOOSE packet;

a warning module configured to issue a warning message when no ready response is received from the upstream switch device;

a request receiving module configured to receive the abnormal condition event confirmation request from a downstream switch device which receives the GOOSE packet;

a request determination module configured to generate a ready response when the request determination module determines that the abnormal condition event triggered by the switch device matches with the abnormal condition event confirmation request; and a request reply transmitting module configured to transmit the ready response to the downstream switch device.

2. The switch device according to claim 1, wherein the request transmitting module transmits the abnormal condition event confirmation request to the upstream switch device according to a packet port mapping table established by the switch device.

3. The switch device according to claim 1, wherein the packet determination module checks a TATL field, a sqNum field, an APP ID field or a goCBRef field of the copied GOOSE packet to determine whether the copied GOOSE packet triggers an abnormal condition event Timeout, an abnormal condition event Tampered, or an abnormal condition event Sequence Disorder.

4. The switch device according to claim 1, wherein the packet receiving module receives the GOOSE packet from an intelligent electronic device (IED) or the upstream switch device, and the packet transmitting module transmits the GOOSE packet to other intelligent electronic device or the downstream switch device.

5. The switch device according to claim 1, wherein the packet access control module accesses and copies the GOOSE packet by using a packet access control function of an Ethernet switch chip.

6. An error warning method for a switch device for a substation, and the error warning method comprising:

receiving, by the switch device, a generic object oriented substation event (GOOSE) packet;

transmitting, by the switch device, the GOOSE packet;

copying and accessing the GOOSE packet to generate a copied GOOSE packet when the switch device receives the GOOSE packet;

generating an abnormal condition event confirmation request when the switch device determines that the copied GOOSE packet triggers an abnormal condition event;

transmitting, by the switch device, the abnormal condition event confirmation request to an upstream switch device which transmits the GOOSE packet;

issuing a warning message when no ready response is received from the upstream switch device;

receiving, by the switch device, the abnormal condition event confirmation request from an downstream switch device which receives the GOOSE packet;

generating a ready response when the switch device determines the abnormal condition event triggered by the switch device matches with the abnormal condition event confirmation request; and transmitting, by the switch device, the ready response to the downstream switch device.

7. The error warning method according to claim 6, wherein the request transmitting module transmits the abnormal condition event confirmation request to the upstream switch device, which corresponds to the received GOOSE packet, according to a packet port mapping table established by the switch device.

8. The error warning method according to claim 6, wherein the packet determination module checks a TATL field, a sqNum field, an APP ID field or a goCBRef field of the copied GOOSE packet to determine whether the copied GOOSE packet triggers an abnormal condition event Timeout, an abnormal condition event Tampered, or an abnormal condition event Sequence Disorder.

9. The error warning method according to claim 6, wherein the packet receiving module receives the GOOSE packet from an intelligent electronic device (IED) or the upstream switch device, and the packet transmitting module transmits the GOOSE packet to other intelligent electronic device or the downstream switch device.

10. The error warning method according to claim 6, wherein the packet access control module accesses and copies the GOOSE packet by using a packet access control function of an Ethernet switch chip.

* * * * *